(12) United States Patent
Norris et al.

(10) Patent No.: US 6,794,601 B2
(45) Date of Patent: *Sep. 21, 2004

(54) PLASMA ARC TORCH SYSTEM WITH PILOT RE-ATTACH CIRCUIT AND METHOD

(75) Inventors: Stephen W. Norris, New London, NH (US); Roger Chamberlin, Sunapee, NH (US); David Morrie, Claremont, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/235,325

(22) Filed: Sep. 5, 2002

(65) Prior Publication Data

US 2004/0045942 A1 Mar. 11, 2004

(51) Int. Cl.$^7$ ................................................ B23K 9/00
(52) U.S. Cl. ........................... 219/121.57; 219/121.51; 219/121.54
(58) Field of Search ................ 219/121.11, 121.36, 219/121.48, 121.5, 121.52, 121.54, 121.57, 121.51

(56) References Cited

U.S. PATENT DOCUMENTS

| | | | |
|---|---|---|---|
| 2,960,594 A | 11/1960 | Thorpe ........................ | 219/75 |
| 3,813,510 A | 5/1974 | Hatch ..................... | 219/121 P |
| 3,988,566 A | 10/1976 | Vogts et al. ............. | 219/121 P |
| 4,122,327 A | 10/1978 | Vogts et al. ............. | 219/121 P |
| 4,280,042 A | 7/1981 | Berger et al. .......... | 219/121 PT |
| 4,766,286 A | 8/1988 | Iceland .................... | 219/21.57 |
| 4,901,720 A | 2/1990 | Bertrand ..................... | 606/40 |
| 4,929,811 A | 5/1990 | Blankenship .......... | 219/121.54 |
| 4,996,407 A | 2/1991 | Traxler .................. | 219/121.54 |
| 5,036,176 A | 7/1991 | Yamaguchi et al. ... | 219/121.44 |
| 5,170,030 A | 12/1992 | Solley et al. .......... | 219/121.54 |
| 5,235,162 A | 8/1993 | Nourbakhsh ........... | 219/121.54 |
| 5,296,665 A | 3/1994 | Peterson et al. ....... | 219/121.57 |
| 5,416,297 A * | 5/1995 | Luo et al. .............. | 219/121.57 |
| 5,506,384 A | 4/1996 | Yamaguchi ............. | 219/121.57 |
| 5,530,220 A | 6/1996 | Tatham ................... | 219/121.57 |
| 5,620,617 A | 4/1997 | Borowy et al. ........ | 219/121.54 |
| 5,630,952 A | 5/1997 | Karino et al. .......... | 219/121.57 |
| 5,660,745 A | 8/1997 | Naor ...................... | 219/121.57 |
| 5,796,067 A | 8/1998 | Enyedy et al. ......... | 219/121.52 |
| 5,828,030 A | 10/1998 | Naor ...................... | 219/121.57 |
| 5,831,237 A | 11/1998 | Daniel .................... | 219/121.54 |
| 5,844,197 A | 12/1998 | Daniel .................... | 219/121.57 |
| 5,847,354 A | 12/1998 | Daniel .................... | 219/121.54 |
| 5,864,110 A | 1/1999 | Moriguchi et al. ..... | 219/121.57 |
| 5,866,869 A | 2/1999 | Schneider et al. ..... | 219/121.39 |
| 5,866,872 A | 2/1999 | Lu et al. ................. | 219/121.56 |
| 5,900,169 A | 5/1999 | Borowy et al. ........ | 219/121.57 |
| 5,961,855 A | 10/1999 | Hewett et al. ......... | 219/121.39 |
| 5,990,443 A | 11/1999 | Tatham et al. ......... | 219/121.57 |
| 6,054,670 A | 4/2000 | Naor ...................... | 219/121.39 |
| 6,133,543 A | 10/2000 | Borowy et al. ........ | 219/121.57 |
| 6,350,960 B1 | 2/2002 | Norris .................... | 219/121.54 |
| RE37,608 E * | 3/2002 | Solley et al. .......... | 219/121.54 |
| 6,369,350 B1 | 4/2002 | Norris .................... | 219/121.57 |

* cited by examiner

*Primary Examiner*—Tu Hoang
(74) *Attorney, Agent, or Firm*—Harness, Dickey & Pierce, P.L.C.

(57) ABSTRACT

A plasma arc torch system, a circuit, and a method for controlling a pilot arc is disclosed. A rate of change sensor, such as a dv/dt sensor, monitors an output current signal or an output voltage signal to determine whether to close a switch to re-attach a pilot arc before a transferred arc becomes extinguished. The switch selectively connects a tip into a circuit path with an electrode and a power supply to allow the pilot arc to form between the tip and the electrode. A power supply preferably regulates the output current or voltage to a first level when a pilot arc is present, and to a second mode when a transferred arc is present.

23 Claims, 3 Drawing Sheets

PLASMA ARC TORCH SYSTEM WITH PILOT RE-ATTACH CIRCUIT AND METHOD

FIELD OF THE INVENTION

The present invention relates generally to plasma arc torch systems and power supplies. In particular, the invention relates to a circuit and method for controlling the pilot arc in a plasma arc torch.

BACKGROUND OF THE INVENTION

Plasma arc torches, also known as electric arc torches, are commonly used for cutting, welding, and spray bonding workpieces. Such torches typically operate by directing a plasma consisting of ionized gas particles toward a workpiece. An example of a conventional gas plasma arc torch is disclosed in U.S. Pat. No. 3,813,510, the entire disclosure of which is incorporated herein by reference.

In general, a pressurized gas to be ionized is supplied to the front end of the torch and flows past an electrode before exiting through an orifice in a torch tip. The electrode has a relatively negative potential and operates as a cathode. The torch tip, which is adjacent the electrode at the front end of the torch, constitutes a relatively positive potential anode. When a sufficiently high voltage is applied to the electrode, an arc is established across the gap between the electrode and the torch tip, thereby heating the gas and causing it to ionize. The ionized gas in the gap is blown out of the torch and appears as a flame extending externally from the tip. The arc so established is commonly referred to as a pilot arc. A typical pilot arc circuit may provide 5–50 amps, at 100–200 volts across the electrode to tip gap.

In order to use a plasma arc torch with a workpiece, a main or cutting arc must normally be established between the electrode and the workpiece. As the torch head or front end is brought toward the workpiece, the arc transfers between the electrode and the workpiece because the impedance of the workpiece to negative is typically lower than the impedance of the torch tip to negative. During this "transferred arc" operation, the workpiece serves as the anode.

Once the arc transfer is sensed, it is generally preferred to cease current flow between the electrode and the tip. One method of terminating current flow between the electrode and the tip is to open circuit the pilot arc current path. This may be accomplished by sensing the presence of current flowing in the workpiece and open circuiting a switch between the tip and ground (positive return). Commonly owned U.S. Pat. Nos. 5,170,030, 5,530,220, and 6,369,350, the entire disclosures of which are incorporated herein by reference, describe the arc transfer process in greater detail.

After arc transfer occurs, the output current is typically increased to a higher, cutting level. The power supply preferably is current controlled so that the cutting current is maintained at or near a constant current level. If, however, the transferred arc is stretched beyond the capacity of the power supply it can extinguish. The arc may stretch, for example, when cutting a discontinuous workpiece (e.g., a metal grate), when cutting near the end of a workpiece, or when the torch is moved away from the workpiece. Once the arc has been extinguished, the torch starting process must typically be repeated. As can be appreciated, restarting the torch is relatively inefficient. Therefore, it is generally preferable to cause the pilot arc to re-attach before the transferred arc extinguishes.

U.S. Pat. No. 5,620,617 discloses an arc control circuit for a plasma arc torch. A comparator compares the output voltage of the power supply to a maximum voltage. When the output voltage exceeds the maximum voltage, the comparator sets a logic device. The logic devices generates a signal to close a switch and reconnect the nozzle to the power supply, thereby switching the arc from the workpiece to the nozzle.

U.S. Pat. No. 5,844,197 discloses an arc retract circuit for use in a plasma arc torch. The system disclosed therein involves creating a first signal representing the actual current applied by the power supply to the power circuit driving the plasma torch, creating a second signal representative of a current level below the set current level for the cutting operation, and closing a power switch in the pilot arc circuit when the first signal is essentially equal to the second signal.

The arc control/retract circuits disclosed in these patents require a comparison to a predefined reference (either voltage or current) in order to properly operate. Accordingly, such circuits are inherently limited by the reference chosen and require additional circuitry to establish the predefined reference.

For these reasons, a plasma arc torch system having an improved pilot re-attach circuit and method is desired. Such a system and method requires the creation of no additional current or voltage reference signal in order to accurately sense when to cause the pilot arc to re-attach. Further, such a system and method preferably uses an existing signal to determine when to re-attach the pilot arc. Finally, such a system and method preferably provides a reliable and repeatable method of re-attaching the pilot arc prior to the extinguishment of the transferred arc.

SUMMARY OF THE INVENTION

The invention meets the above needs and overcomes the deficiencies of the prior art by providing an improved circuit and method for accurately determining whether and when to re-attach a pilot arc when a transferred arc may no longer be sustained. Advantageously, this is accomplished by monitoring the current or voltage output of an already existing circuit associated with a standard regulated power supply. Moreover, the improvement can be accomplished without the need for creating additional reference signals for comparison purposes that are not already present in a regulated power supply.

Briefly described, a plasma arc torch system for use in connection with a workpiece embodying aspects of the invention includes a power source providing a power output current. An electrode is positioned in a circuit path with the power source. The output current flows through the electrode. A tip is adjacent the electrode. A current reference circuit provides a current reference signal that has a parameter indicative of a desired output current. A current regulator circuit provides a signal indicative of the output current. A rate of change sensor receives the output current signal. The rate of change sensor detects a rate of change in the output current signal and selectively provides a switch control signal that has a parameter indicative of the rate of change in the output current signal. A switch circuit is responsive to the switch control signal. The switch circuit selectively electrically connects the tip into the circuit path.

Another embodiment of a plasma arc torch system for use with workpiece in accordance with the invention includes a power source providing an output current. An electrode is positioned in a circuit path with the power source. A tip is adjacent the electrode. A current reference circuit provides a current output signal having a parameter indicative of the output current. A rate of change sensor is electrically connected to the output current signal and receives the output current signal and selectively provides a switch control signal in response to a rate of change in the output current signal. A switch circuit is responsive to the switch control signal. The switch circuit selectively electrically connects the tip into the circuit path with the power source and the electrode.

Another embodiment of the invention includes a pilot re-attach circuit for use in a plasma arc torch system. The torch system includes a power source that provides an output current. An electrode is positioned in a circuit path with the power source. A tip is adjacent the electrode. The pilot re-attach circuit includes a rate of change sensor that receives an output current signal and that is responsive to a time rate of change of the output current signal. The rate of change sensor provides a switch control signal having a first state when the time rate of change of the output current signal is less than a threshold. The rate of change signal has a second state when the time rate of change of the output current signal exceeds the threshold. A pilot switch is responsive to the switch control signal. The pilot switch is operable to electrically connect the tip into the circuit path with the power source and the electrode when the switch control signal is in the second state.

In still another embodiment, the invention includes a plasma arc torch system for use in connection with a workpiece. A power source means provides an output current. An electrode is positioned in a circuit path with the power source means. The electrode receives the output current. A tip is adjacent the electrode. A current sensing means provides an actual output current signal having a parameter indicative of the output current. A detector means is electrically connected to the current sensing means. The detector means receives the output current signal and selectively provides a switch control signal in response to a rate of change in the output current signal. A switching means is responsive to the switch control signal for selectively electrically connecting the tip into the circuit path with the power source means and the electrode.

Another embodiment of the invention includes a method of operating a plasma arc torch system that includes a power supply that supplies an output current, and a pilot switch that establishes a pilot arc mode of operation. An output current signal having a parameter representative of the output current is monitored for a rate of change. The pilot switch is operated when the rate of change of the output current signal exceeds a rate of change threshold such that the pilot arc mode of operation is established.

In still another embodiment, the invention includes a method of reestablishing a pilot arc in a plasma arc torch system before a transferred arc is extinguished. The plasma arc torch system includes an electrical power source providing an output current. An electrode receives the output current. A tip is adjacent the electrode. A pilot switch selectively connects the tip in a circuit path with the electrode and the power source such that when the pilot switch is closed, a pilot arc is selectively established between the electrode and the tip. The method includes monitoring an output current signal having a parameter representative of the output current provided by the electrical power source. The output current signal is monitored for a rate of change. A switch control signal is generated in response to the detected rate of change in the output current signal. The switch control signal is representative of whether the detected rate of change in the output current signal is greater than or less than a rate of change threshold. A pilot switch is operated in response to the rate of change signal such that when the rate of change is greater than the rate of change threshold, the pilot switch closes and connects the tip into the circuit path with the electrode and the power source.

Furthermore, plasma arc torch systems, pilot re-attach circuits, and methods of operating a plasma arc torch system are provided that use an output voltage signal rather than an output current signal as previously described. Accordingly, a rate of change of the output voltage signal, rather than the rate of change of the output current signal, is used to connect the tip into the circuit path when the arc is about to be extinguished.

In yet another form, a plasma arc torch system is provided that uses an output power signal rather than a current or voltage signal as previously described, wherein a power supply that does not generate power with electricity is contemplated, such as a fuel cell power supply. Similarly, a rate of change of the output power signal is used to connect the tip into a circuit path when the arc is about to be extinguished.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference characters indicate corresponding parts throughout the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
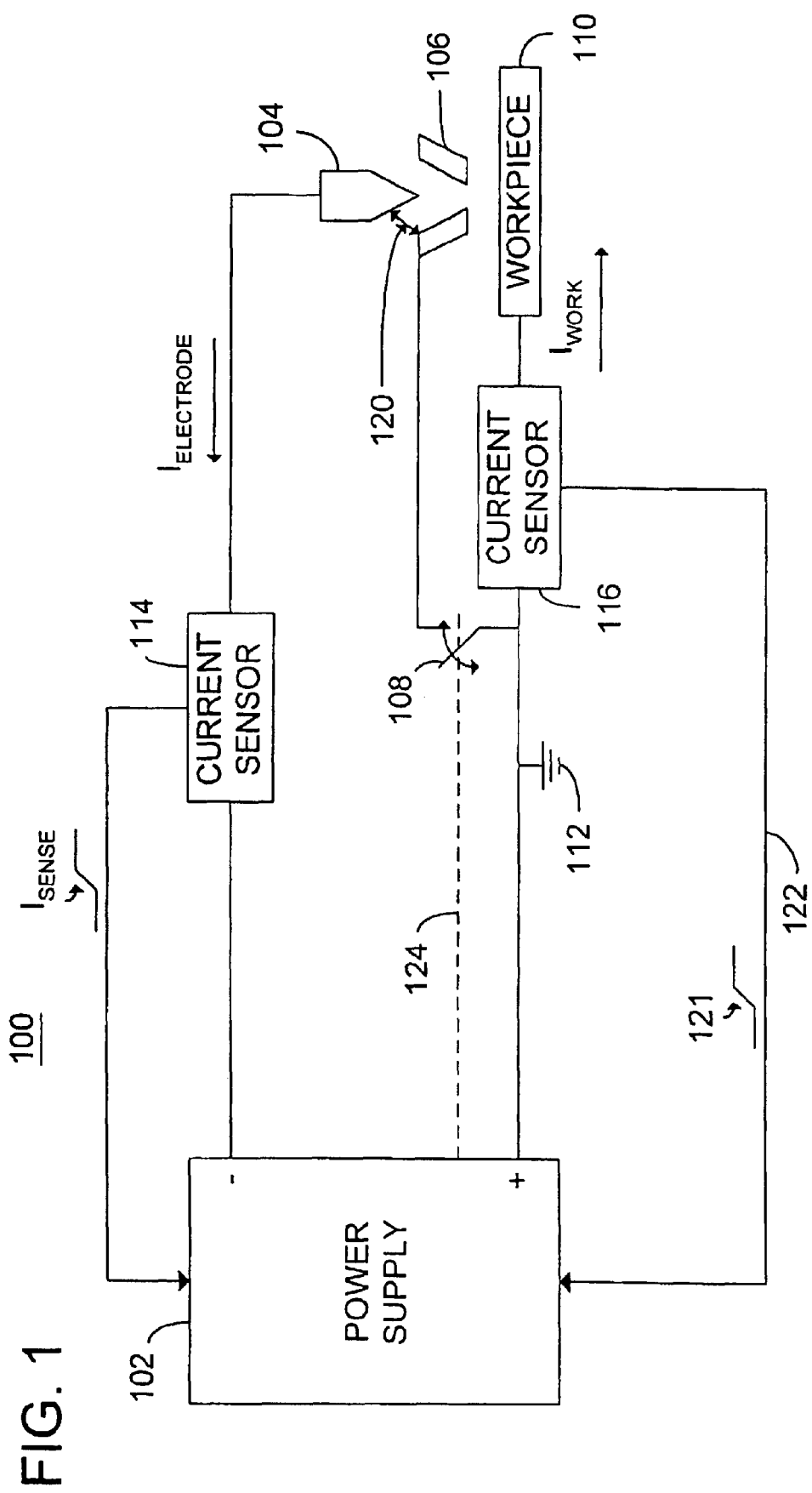
FIG. 1 is a block diagram of a plasma arc torch system suitable for use with a pilot re-attach circuit and method according to the present invention.

Referring now to the drawings, FIG. 1 is a block diagram that illustrates several basic components of a plasma arc torch system 100 that is suitable for use with a pilot re-attach circuit and method according to the present invention. Such a system 100 includes a power supply 102, an electrode 104, a tip 106 (also referred to as a nozzle), and a pilot switch 108. The electrode 104 is electrically connected in a circuit path to the negative side of the power supply 102. The tip 106 is connected to the pilot switch 108 which is selectively operable to connect tip 106 to a positive ground 112, which is connected to the positive side of power supply 102. The pilot switch 108 preferably provides a low impedance path between tip 106 and ground 112. A workpiece 110 is also connected to ground 112. It should be understood that pilot switch 108, although illustrated external to power supply 102, is preferably internal to the power supply housing. A first current sensor 114 is connected in the circuit path at a position allowing it to sense an electrode current $I_{electrode}$ flowing through electrode 104. There are a variety of current detecting/sensing means available including high power, low impedance resistors, current sensing toroids, hall sensors, and the like. The electrode current $I_{electrode}$ represents the total current draw of the torch system. A second current sensor 116 is associated with workpiece 110. The second current sensor 116 is also referred to as a work current sensor 116 and may also comprise a high power, low impedance resistor, a current sensing toroid, a hall sensor or any other suitable current sensing/detecting device. Work current sensor 116 detects the current $I_{work}$ flowing through workpiece 110, and is preferably associated with the lead connecting workpiece 110 to the positive side of power supply 102.

The general operation of torch system 100, from initial power up through the initiation of a cutting operation will now be discussed. Upon power up and satisfactory completion of various initial safety interlock checks, pilot switch 108 should be initially closed (conducting) because no current is sensed in work current sensor 116. As such, tip 106 is connected in the circuit path between ground 112 and electrode 104. The torch operator initially establishes a pilot arc between electrode 104 and tip 106 by one of several ways which are generally known in the art. Such starting methods include, for example, contact starting or creating a spark by way of a high frequency, high voltage starting circuit. Thus, as ionized gas flows past electrode 104 and through tip 106, the current flowing through electrode 104 jumps the gap 120 between electrode 104 and tip 106 to form a pilot arc (not shown). As tip 104 is moved closer to workpiece 110, some of the total current begins to flow in workpiece 110 as the arc transfers to workpiece 110. Work current sensor 116 senses this work current flow and sends a work current signal 121 to power supply 102 via line 122. When power supply 102 receives the work current signal 121 on line 122, it opens pilot switch 108 (shown by dashed line 124) thereby disconnecting tip 106 from ground 112. With pilot switch 108 open (non-conducting), the impedance between electrode 104 and workpiece 110 is much lower than the impedance between electrode 104 and the now open-circuited tip 106, therefore, the entire arc tends to flow between electrode 104 and workpiece 110. This is referred to as a transferred arc mode of operation (transferred arc not shown) and the current flowing in this mode may be referred to as a cutting current. In this transferred arc mode, substantially all of the electrode current $I_{electrode}$ flows between electrode 104 and workpiece 110 as a cutting current for cutting workpiece 110. Also, when tip 106 is disconnected, the pilot mode is terminated and the output demand may increase from the current level used during the pilot mode (e.g., around 15 to 20 A) to the cutting current level (e.g., 25 to 80 A or more). The actual cutting current level is preferably user selectable via an adjustment knob (not shown), but may also be fixed at one or a plurality of settings.

As discussed above in the Background of the Invention, when cutting a discontinuous workpiece or the transferred arc otherwise stretches (i.e., because the torch nears the end of the workpiece or the torch is being pulled away from the workpiece), the power supply, such as power supply 102, must provide a greater voltage potential between electrode 104 and workpiece 110 to maintain the arc at the desired output current level. After the power supply cannot supply the necessary voltage to maintain the output current, the transferred arc extinguishes.

Figure 2:
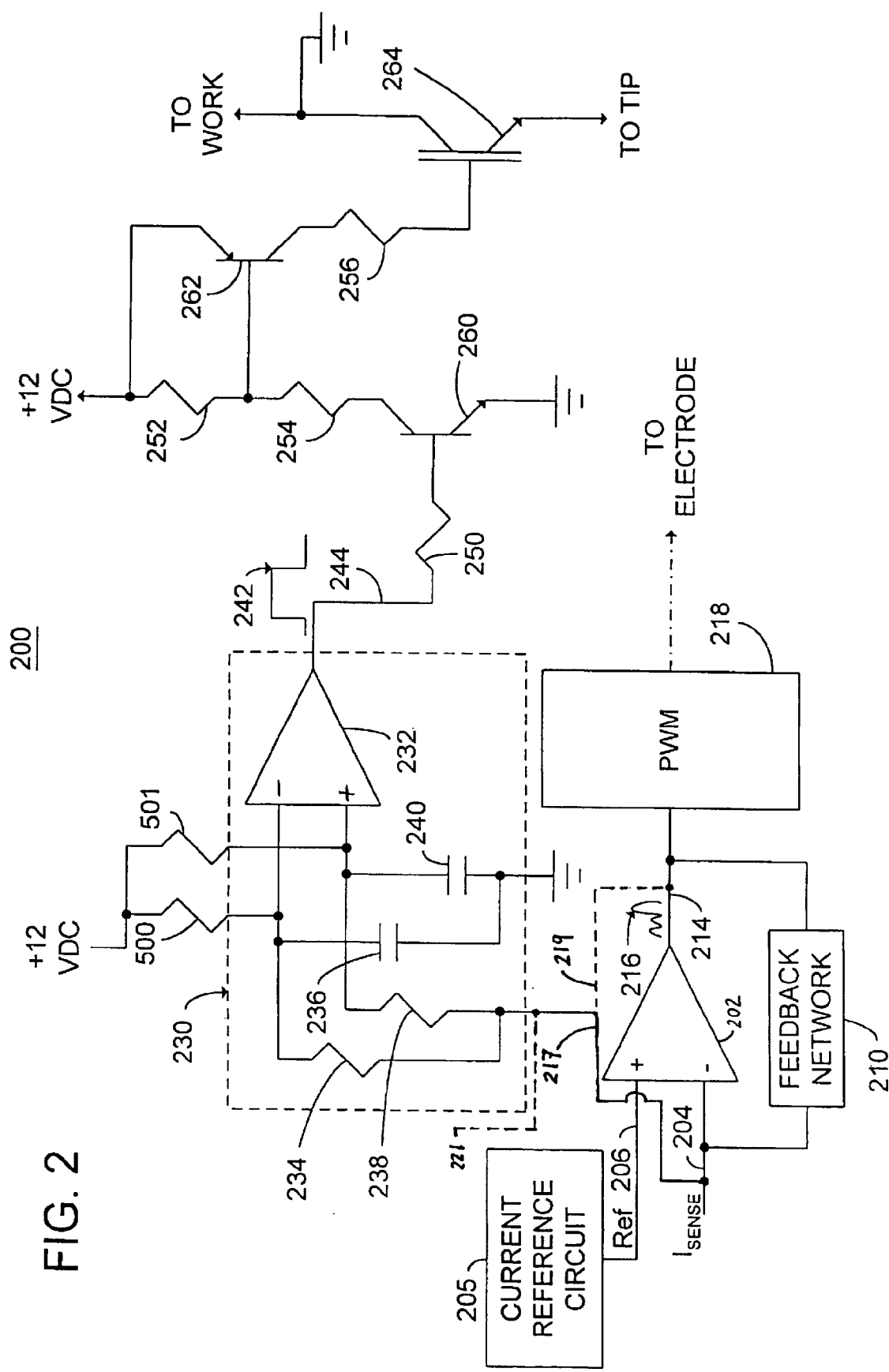
FIG. 2 is a schematic of a pilot re-attach circuit suitable for use with the present invention.

FIG. 2 is a schematic of a preferred pilot re-attach circuit 200 for re-establishing the pilot arc between electrode 104 and tip 106 before the transferred arc extinguishes. As illustrated in FIG. 2, the pilot re-attach circuit 200 preferably includes an error amplifier 202, which is a standard part of a regulated power supply, configured to receive and compare signals representative of the actual output current (shown in FIGS. 1 and 2 as $I_{sense}$) and the desired operating current (shown in FIG. 2 as Ref.). For example, $I_{sense}$ is a signal that may be derived from current sensor 114 (FIG. 1) and includes a parameter indicative of the current flowing through electrode 104 (e.g., $I_{electrode}$). Thus, it should be understood that the signals representative of the actual output current ($I_{sense}$) and the desired operating current (Ref.) reflect the actual and desired current values, but need not be such values per se.

The error amplifier 202 is preferably configured as a high gain device (e.g., greater than 100). In particular, a feedback control network 210 is preferably connected between an output 214 of error amplifier 202 and its inverting input 204. Thus, error amplifier output 214 provides a high gain voltage signal 216 (also referred to as an error signal or a current control error signal) indicative of the difference between the desired operating current (operating current set point, Ref.) and the sensed output current ($I_{sense}$). The output 214 of error amplifier 202 is connected to a pulse width modulator 218 (PWM 218), the operation of which is described below, as part of the power supply regulation loop.

The output current, $I_{sense}$, is also connected to a dv/dt sensor 230 that is constructed and configured to respond to changes over time in the output current, $I_{sense}$. In the embodiment illustrated in FIG. 2, the dv/dt sensor 230 preferably includes a comparator 232, and two R-C input networks. The first R-C network comprises a resistor 234 and a capacitor 236. One side of the resistor 234 is connected to an output current signal 217 that is representative of the output current, $I_{sense}$. The other side of resistor 234 is connected to the inverting input of the comparator 232. Similarly, one side of the capacitor 236 is connected to the inverting input of comparator 232, while the other side is connected to ground. The second R-C network comprises a resistor 238 and a capacitor 240. One side of the resistor 238 is connected to the output current signal 217. The other side of resistor 238 is connected to the non-inverting input of the comparator 232. One side of the capacitor 240 is connected to the non-inverting input of comparator 232, while the other side is connected to ground. The time constant of the first R-C network (resistor 234 and capacitor 236) is preferably shorter than the time constant of the second R-C network (resistor 238 and capacitor 240) so that comparator 232 can detect sharp decreases in current signal 217.

The dv/dt sensor 230 provides a switch control signal 242 on output line 244 to a switch control network that includes resistors 250, 252, 254, 256, npn transistor 260, pnp transistor 262, and pilot switch 264. More particularly, the output of comparator 232 is coupled to the base of transistor 260 via line 244 and the series resistor 250. The emitter of transistor 260 is connected to ground. The collector of transistor 260 is connected to a positive bias voltage (e.g., 12 VDC) through two series resistors 252, 254. The emitter of transistor 262 is connected to the 12 VDC bias voltage. The base of transistor 262 is connected to the junction of series resistors 252, 254. The collector of transistor 262 is connected to the gate of pilot switch 264 through resistor 256. As illustrated in FIG. 2, pilot switch 264 preferably comprises an IGBT because of its superior power switching characteristics and capabilities. It is to be understood, however, that other power switching devices such as thyristors, power transistors, relays, and the like may be used with the present invention.

The collector of pilot switch 264 is connected to workpiece 110 and ground, and the emitter is connected to tip 106. Thus, when pilot switch 264 is closed (conducting), tip 106 is connected to ground in the circuit path, thus allowing current to flow between electrode 104 and tip 106.

Referring now to both FIGS. 1 and 2, the torch system 100 preferably operates in a constant current/current-controlled mode. Hence, when the torch operates in the pilot mode, output current ($I_{electrode}$) is preferably maintained at a relatively low pilot level (e.g., 15 A) by varying the pulse widths of the output voltage of PWM 218. Similarly, when torch system 100 operates in the transferred arc mode, output current ($I_{electrode}$) is preferably maintained at a relatively higher cutting level (e.g., 25 A or more) by varying the pulse widths of the output voltage. The desired cutting current level is preferably manually selectable via a switch 205 (also referred to as a current reference circuit) that allows for several discrete current settings or continuously variable current settings within upper and lower limits. It should be appreciated, however, that the present invention should not be limited as such and could work as well with a system having a single cutting current set limit. In the pilot mode, a fixed or preset current level may be used.

Current control is a preferred method of controlling the power in plasma arc torches. Current control is typically achieved by controlling the pulse widths of the voltage applied to the output filter inductor (not shown). Stated differently, power supply 102 uses pulse width modulation of the applied voltage to attempt to provide a constant current output. The pulse width applied is a function of error signal 216 from error amplifier 202. As such, error amplifier 202 forms part of a current regulator circuit, or a voltage regulator circuit, along with PWM 218.

Error amplifier 202 receives two inputs. The first input is a signal ($I_{sense}$) that is representative of the actual output current ($I_{electrode}$). The second input is a reference signal that reflects the desired current level (e.g., 15 A in the pilot mode, or 25 A or more in the transferred arc mode). When both inputs to error amplifier 202 are substantially the same, current control is being achieved, and the error signal 216 from error amplifier 202 changes a small amount, if at all. PWM 218 is responsive to this error signal 216 and adjusts the output pulses accordingly. In other words, small changes in error signal 216 result in small changes in the output pulses. If, on the other hand, there is a substantial difference between the $I_{sense}$ signal and the reference signal, error signal 216 will be larger.

As explained already herein, when the torch system 100 is used in the transferred arc mode to cut a discontinuous workpiece or the torch is moved away from the workpiece, the transferred arc length tends to stretch. This stretching of the transferred arc increases the voltage potential required to maintain the arc, and consequently, paces increased pulse width demands on power supply 102 in general and on PWM 218 in particular. Error signal 216 reflects this change. As the arc length increases, at some point PWM 218 supplies maximum pulse widths in an attempt to maintain the current at the set point level. When PWM can no longer maintain the current level at the desired level, the output current signal 217 rapidly decreases. It is this rapid decrease in output current signal 217 that dv/dt sensor 230 advantageously utilizes to determine that the transferred arc may soon extinguish.

Output current signal 217 is fed to the inverting and non-inverting inputs of comparator 232 via two R-C input networks. The first network comprises resistor 234 and capacitor 236; the second network comprises resistor 238 and capacitor 240. In the preferred embodiment illustrated in FIG. 2, the relative time constants of the first and second R-C input networks are selected such that comparator 232 provides a high output via switch control signal 242 only when a sharp rate of change occurs in the output current signal 217—when the output current, $I_{sense}$, decreases sharply. Thus, by configuring the first R-C network to have a shorter time constant than the second R-C network, comparator 232 can be tuned to detect changes in the slope of output current signal 217. Resistors 500 and 501 normally bias the inputs of comparator 232 so that its output is low. For example, if resistor 234 is 100 kΩ, capacitor 236 is 220 pf, resistor 238 is 100 kΩ, and capacitor 240 is 0.1 µf, the time constant of the first R-C network is 22 µsec, and the time constant of the second R-C network is 10 msec. It is to be understood that the foregoing values are provided for exemplary purposes only and they are not to be read in anyway as limiting any aspect of the present invention. It is also to be understood that other timing relationships are possible and contemplated within the scope of the present invention. It is further to be understood that other rate of change detectors may be used. Such detectors may include, for example, an operation amplifier, or a digital control system.

When dv/dt sensor 230 senses a sharp decrease in output current signal 217, it asserts switch control signal 242 on line 244. The switch control network, including transistors 260, 262, and pilot switch 264, receives and is responsive to switch control signal 242. Thus, when dv/dt sensor 230 asserts switch control signal 242, pilot switch 264 is gated on (conducts) so that tip 106 is connected into the circuit path with electrode 104. Recalling that at this point the transferred arc length has been stretched, the relative impedance between tip 106 and electrode 104 is typically less than the impedance between workpiece 110 and electrode 104. Accordingly, when pilot switch 264 conducts, a pilot arc is re-attached between electrode 104 and tip 106.

The operation of the switching network and the gate control of pilot switch 264 will now be briefly described. When dv/dt sensor 230 detects a sharp decrease in output current signal 217, switch control signal 242 is applied to the base of transistor 260 via resistor 250. Because the collector of transistor 260 is connected to a positive voltage bias (e.g., 12 VDC), it acts as a switch and conducts when switch control signal 242 is applied. When transistor 260 conducts, a voltage drop is induced across resistor 252, thus causing transistor 262 to conduct. When transistor 262 conducts, a voltage is applied to the gate of pilot switch 264 (an IGBT) causing that switch to close (conduct), thereby connecting tip 106 into the circuit path.

As can now be appreciated, the present invention provides several advantages over prior art arc control systems and circuits. For example, the dv/dt sensor does not require the use of artificial voltage or current comparisons to determine when to close pilot switch 264. Rather, by using dv/dt sensor 230 to monitor the output current, $I_{sense}$, that is normally used to drive PWM 218, the dv/dt sensor of the present invention requires no separate, artificial reference standards. Further, by sensing sharp changes in output current signal 217, the dv/dt sensor accurately and reliably detects when a transferred arc has been stretched to the limit of being extinguished.

Alternately, the dv/dt sensor 230 may monitor an output voltage signal 219 as indicated by the dashed line in FIG. 2 rather than the output current signal 217. Accordingly, the dv/dt sensor 230 senses sharp changes in output voltage signal 219 to detect when a transferred arc has been stretched to the limit of being extinguished as previously described with reference to the output current signal 217. In yet another form, the dv/dt sensor 230 may monitor an output power signal 221. The dv/dt sensor 230 senses sharp changes in output power signal 221 to detect when a transferred arc is about to be extinguished as previously described with reference to the output power signal 221. For example, the output power signal 221 may be provided by a power supply that generates power using fuel cells.

Figure 3:
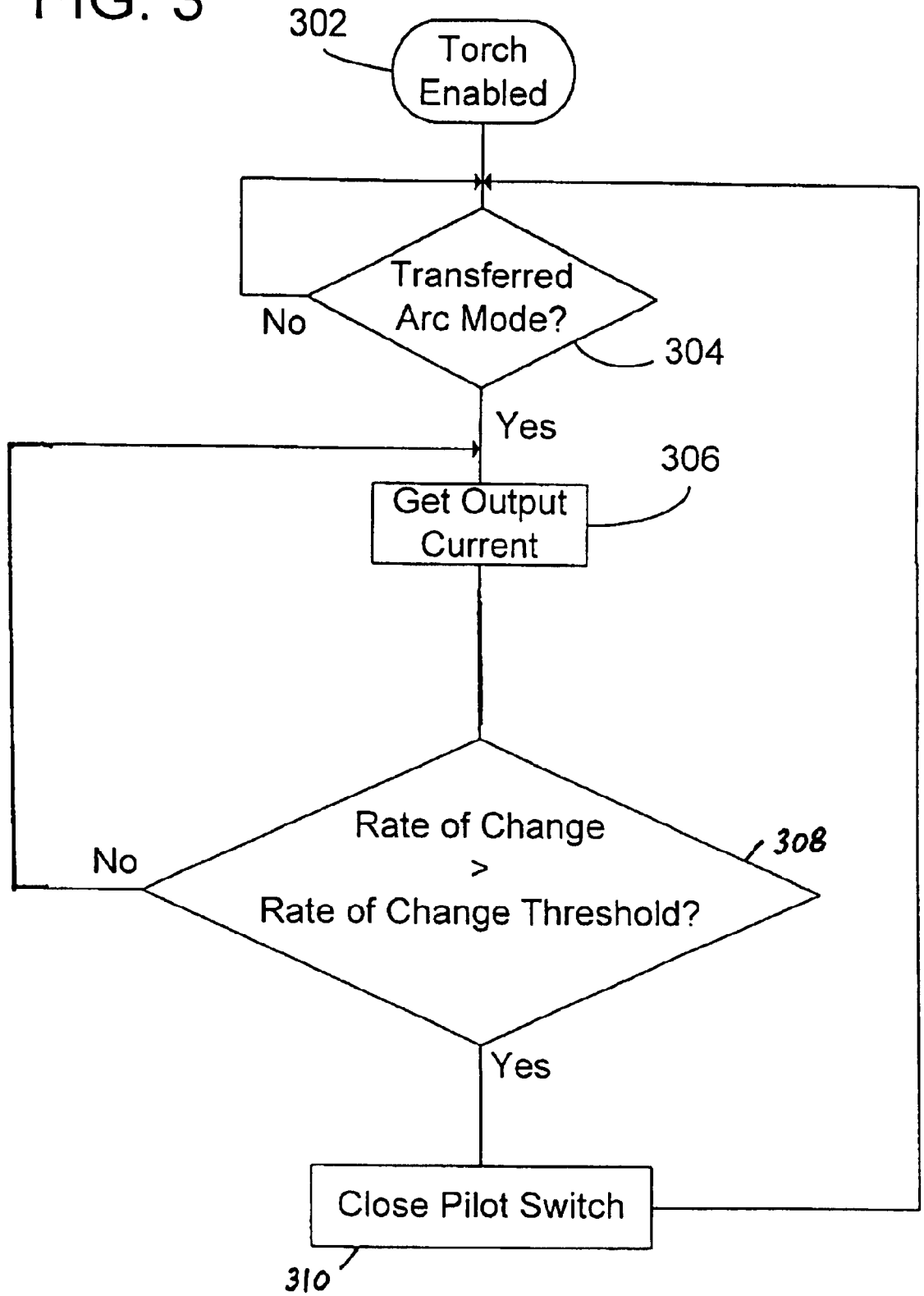
FIG. 3 is a flow diagram that illustrates a method operating an arc in a plasma arc torch system by monitoring the rate of change of a difference signal.

FIG. 3 is a flow diagram that describes a process by which arc transfer and re-attach can be achieved. In particular, FIG. 3 illustrates a method of operating an arc in a plasma arc torch system that includes monitoring the rate of change in a difference signal. At step 302, the torch is enabled (e.g., all safety interlocks have been satisfied and some form of arc, pilot or transferred, has been struck). If it is determined at step 304 that the torch system is operating in the pilot mode, the pilot switch is already closed, so the process waits. If the torch system is operating in the transferred arc mode, the actual output current is determined at step 306. It should be understood that rather than monitoring current per se, a current sensing device may be used that supplies a signal that is representative of the actual output current. At step 308, the rate of change in the output current signal is determined. This may be accomplished, for example, by determining the slope of the output current signal. If, at step 308, the rate of change is greater than a rate of change threshold, the pilot switch is closed (conducting) at step 310. If, however, the rate of change is not greater than the rate of change threshold, the process repeats and the pilot switch remains open (non-conducting). In other words, if the rate of change exceeds a threshold, the tip is re-connected into the circuit to cause the pilot arc to re-attach.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A plasma arc torch system for use in connection with a workpiece, the torch system comprising:
    a power source providing an output current;
    an electrode positioned in a circuit path with the power source;
    a tip adjacent the electrode;
    a current regulator circuit providing an output current signal;
    a rate of change sensor receiving the output current signal, said rate of change sensor detecting a rate of change in the output current signal and selectively providing a switch control signal having a parameter indicative of the rate of change in the output current signal; and
    a switch circuit responsive to the switch control signal for selectively electrically connecting the tip into the circuit path.

2. The plasma arc torch system of claim 1 wherein the rate of change sensor comprises a dv/dt sensor configured for sensing a change in the output current signal with respect to time.

3. The plasma arc torch system of claim 2 wherein the dv/dt sensor comprises:
    a comparator having an inverting input and a non-inverting input;
    a first R-C circuit receiving the output current signal and electrically coupled to the inverting input of the comparator, said first R-C circuit having a first R-C time constant; and
    a second R-C circuit receiving the output current signal and electrically coupled to the non-inverting input of the comparator, said second R-C circuit having a second R-C time constant such that the first R-C time constant is shorter than the second R-C time constant.

4. The plasma arc torch system of claim 1 wherein the switch circuit includes an IGBT.

5. The plasma arc torch system of claim 1 wherein the rate of change sensor comprises:
    a comparator having an inverting input and a non-inverting input;
    a first R-C circuit receiving the output current signal and electrically coupled to the inverting input of the comparator, said first R-C circuit having a first R-C time constant; and
    a second R-C circuit receiving the output current signal and electrically coupled to the non-inverting input of the comparator, said second R-C circuit having a second R-C time constant such that the first R-C time constant is shorter than the second R-C time constant.

6. A plasma arc torch system for use in connection with a workpiece, the torch system comprising:
    a power source providing an output current;
    an electrode positioned in a circuit path with the power source;
    a tip adjacent the electrode;
    a voltage regulator circuit providing an output voltage signal;
    a rate of change sensor receiving the output voltage signal, said rate of change sensor detecting a rate of change in the output voltage signal and selectively providing a switch control signal having a parameter indicative of the rate of change in the output voltage signal; and
    a switch circuit responsive to the switch control signal for selectively electrically connecting the tip into the circuit path.

7. The plasma arc torch system of claim 6 wherein the rate of change sensor comprises a dv/dt sensor sensing a change in the output voltage signal with respect to time.

8. The plasma arc torch system of claim 7 wherein the dv/dt sensor comprises:

a comparator having an inverting input and a non-inverting input;

a first R-C circuit receiving the output voltage signal and electrically coupled to the inverting input of the comparator, said first R-C circuit having a first R-C time constant; and a second R-C circuit receiving the output voltage signal and electrically coupled to the non-inverting input of the comparator, said second R-C circuit having a second R-C time constant such that the first R-C time constant is shorter than the second R-C time constant.

9. The plasma arc torch system of claim 6 wherein the switch circuit includes an IGBT.

10. The plasma arc torch system of claim 6 wherein the rate of change sensor comprises:

a comparator having an inverting input and a non-inverting input;

a first R-C circuit receiving the output voltage signal and electrically coupled to the inverting input of the comparator, said first R-C circuit having a first R-C time constant; and a second R-C circuit receiving the output voltage signal and electrically coupled to the non-inverting input of the comparator, said second R-C circuit having a second R-C time constant such that the first R-C time constant is shorter than the second R-C time constant.

11. A pilot re-attach circuit for use in a plasma arc torch system including a power source providing an output current, an electrode positioned in a circuit path with the power source, and a tip adjacent the electrode, said pilot re-attach circuit comprising:

a rate of change sensor receiving an output current signal and responsive to a time rate of change of the output current signal, said rate of change sensor providing a switch control signal having a first state when the time rate of change of the output current signal is less than a threshold and having a second state when the time rate of change of the output current signal exceeds the threshold; and a pilot switch responsive to the switch control signal, said pilot switch being operable to electrically connect the tip into the circuit path with the power source and the electrode when the switch control signal is in the second state.

12. The pilot re-attach circuit of claim 11 wherein the rate of change sensor comprises a dv/dt sensor configured for sensing a change in the time rate of change of the output current signal.

13. The pilot re-attach circuit of claim 12 wherein the dv/dt sensor comprises:

a comparator having an inverting input and a non-inverting input;

a first R-C circuit receiving the output current signal and electrically coupled to the inverting input of the comparator, said first R-C circuit having a first R-C time constant; and a second R-C circuit receiving the output current signal and electrically coupled to the non-inverting input of the comparator, said second R-C circuit having a second R-C time constant such that the first R-C time constant is shorter than the second R-C time constant.

14. The pilot re-attach circuit of claim 11 wherein the pilot switch comprises an IGBT.

15. A pilot re-attach circuit for use in a plasma arc torch system including a power source providing an output voltage, an electrode positioned in a circuit path with the power source, and a tip adjacent the electrode, said pilot re-attach circuit comprising:

a rate of change sensor receiving an output voltage signal and responsive to a time rate of change of the output voltage signal, said rate of change sensor providing a switch control signal having a first state when the time rate of change of the output voltage signal is less than a threshold and having a second state when the time rate of change of the output voltage signal exceeds the threshold; and a pilot switch responsive to the switch control signal, said pilot switch being operable to electrically connect the tip into the circuit path with the power source and the electrode when the switch control signal is in the second state.

16. The pilot re-attach circuit of claim 15 wherein the rate of change sensor comprises a dv/dt sensor sensing a change in the time rate of change of the output voltage signal.

17. The pilot re-attach circuit of claim 16 wherein the dv/dt sensor comprises:

a comparator having an inverting input and a non-inverting input;

a first R-C circuit receiving the output voltage signal and electrically coupled to the inverting input of the comparator, said first R-C circuit having a first R-C time constant; and a second R-C circuit receiving the output voltage signal and electrically coupled to the non-inverting input of the comparator, said second R-C circuit having a second R-C time constant such that the first R-C time constant is shorter than the second R-C time constant.

18. The pilot re-attach circuit of claim 15 wherein the pilot switch comprises an IGBT.

19. A method of operating a plasma arc torch system including a power supply supplying an output current and a pilot switch for establishing a pilot arc mode of operation, said method comprising:

monitoring a rate of change of an output current signal; and operating the pilot switch when the rate of change of the output current signal exceeds a rate of change threshold such that the pilot arc mode of operation is established.

20. A method of operating a plasma arc torch system including a power supply supplying an output voltage and a pilot switch for establishing a pilot arc mode of operation, said method comprising:

monitoring a rate of change of an output voltage signal; and operating the pilot switch when the rate of change of the output voltage signal exceeds a rate of change threshold such that the pilot arc mode of operation is established.

21. A method of re-establishing a pilot arc in a plasma arc torch system before a transferred arc is extinguished, the plasma arc torch system including an electrical power source providing an output current, an electrode receiving the output current, a tip adjacent the electrode, and a pilot switch selectively connecting the tip in a circuit path with the electrode and the power source such that when the pilot switch is closed, a pilot arc is selectively established between the electrode and the tip, the method comprising:

monitoring an output current signal;

detecting a rate of change in the output current signal;

generating a switch control signal in response to the detected rate of change in the output current signal, said switch control signal being representative of whether the detected rate of change in the output current signal is greater than or less than a rate of change threshold; and operating the pilot switch in response to the switch control signal such that when the rate of change is greater than the rate of change threshold the pilot switch closes and connects the tip into the circuit path with the electrode and the power source.

22. A method of re-establishing a pilot arc in a plasma arc torch system before a transferred arc is extinguished, the plasma arc torch system including an electrical power source providing an output voltage, an electrode receiving the output voltage, a tip adjacent the electrode, and a pilot switch selectively connecting the tip in a circuit path with the electrode and the power source such that when the pilot switch is closed, a pilot arc is selectively established between the electrode and the tip, the method comprising:

monitoring an output voltage signal;

detecting a rate of change in the output voltage signal;

generating a switch control signal in response to the detected rate of change in the output voltage signal, said switch control signal being representative of whether the detected rate of change in the output voltage signal is greater than or less than a rate of change threshold; and operating the pilot switch in response to the switch control signal such that when the rate of change is greater than the rate of change threshold the pilot switch closes and connects the tip into the circuit path with the electrode and the power source.

23. A plasma arc torch system for use in connection with a workpiece, the torch system comprising:

a power source providing an output power;

an electrode positioned in a circuit path with the power source;

a tip adjacent the electrode;

a power regulator circuit providing an output power signal;

a rate of change sensor receiving the output power signal, said rate of change sensor detecting a rate of change in the output power signal and selectively providing a switch control signal having a parameter indicative of the rate of change in the output power signal; and a switch circuit responsive to the switch control signal for selectively electrically connecting the tip into the circuit path.

* * * * *